United States Patent Office 2,939,892
Patented June 7, 1960

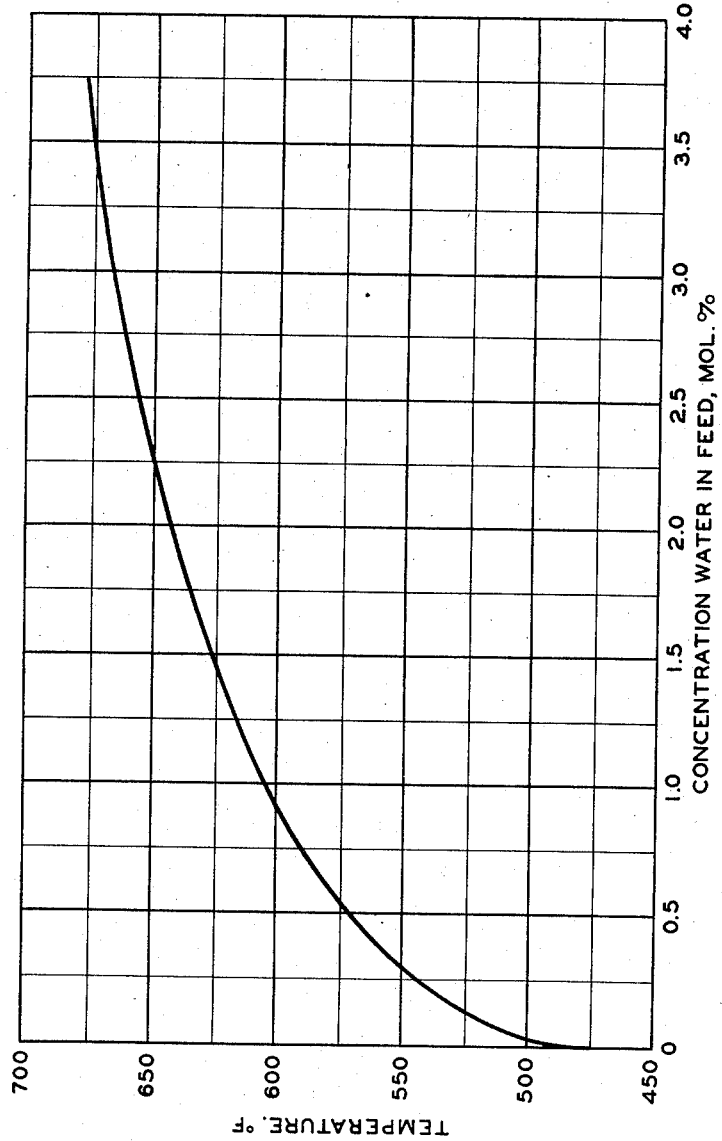

2,939,892

CATALYST CONDITIONING FOR CATALYTIC SELECTIVE REMOVAL OF ACETYLENIC COMPOUNDS FROM FLUIDS CONTAINING SAME

Lloyd E. Gardner and Robert J. Hogan, Bartlesville, Okla., assignors to Phillips Petroleum Company, a corporation of Delaware Filed Dec. 28, 1954, Ser. No. 478,042

12 Claims. (Cl. 260—677)

This invention relates to the purification of fluids. In one aspect this invention relates to a method for conditioning a catalyst comprising an iron oxide promoted with at least one of a suitable alkalizing agent and chromium oxide, for use in the catalytic selective removal of acetylenic compounds from fluids containing same, by treating the said catalyst so as to deposit a predetermined amount of coke thereon. In still another aspect this invention relates to a method for conditioning an alkalized iron oxide-chromium oxide catalyst prior to use of same for the selective hydrogenation of acetylenic compounds in a gas containing same by contacting the said catalyst with a cokable material under conditions for coking same. In another aspect this invention relates to a method for conditioning an alkalized iron oxide-chromium oxide catalyst by contacting same with a cokable material under coking conditions while simultaneously subjecting said catalyst to reducing conditions. In still another aspect this invention relates to a method for conditioning a catalyst comprising an alkalized iron oxide-chromium oxide for the selective hydrogenation above described, by contacting the said catalyst with a gas containing acetylene as a cokable material so as to effect coking of acetylene to deposit a predetermined amount of coke on the catalyst. In still another aspect this invention relates to a method for conditioning an alkalized iron oxide-chromium oxide catalyst for the selective hydrogenation above described by contacting it with a feed stock to be subjected to said selective hydrogenation at a temperature higher than that to be employed during said selective hydrogenation. In still another aspect this invention relates to a catalyst conditioning method of the kind above described wherein, as a cokable material, are employed at least one of an acetylenic compound, a debutanized aromatic concentrate from hydrocarbon cracking, a liquid polymer formed during the said selective hydrogenation process, a diolefin such as butadiene, or the like.

Our invention is particularly advantageously applied to the conditioning of an alkalized iron oxide-chromium oxide catalyst to be employed in the selective removal of acetylenic hydrocarbon contaminants present in an olefin- and/or diolefin-rich stream without substantial loss of the valuable olefin and/or diolefin constituents during the initial period of the selective hydrogenation process. Our invention in one form provides for conditioning the said catalyst so as to eliminate or to markedly shorten the induction period otherwise encountered when initially employing the said catalyst in the selective hydrogenation.

One of the usual methods of manufacturing olefins comprises passing a hydrocarbon material such as ethane, propane, butane, kerosene, or other hydrocarbon-rich stream through a heating zone where such hydrocarbons are decomposed with the formation of hydrogen and one or more unsaturated compounds such as olefins and diolefins. The maximum yield of unsaturated compounds is usually obtained when the operation is performed at high reaction temperatures; however, the use of higher pyrolysis temperatures also results in the formation of acetylenic hydrocarbons which contaminate the product stream. Although the acetylenic compounds are usually present in such hydrocarbon streams in a minor amount, often less than one mol percent, these acetylenic compounds are not readily removed without substantial loss of the more valuable olefin and diolefin constituents.

One method of removing the acetylenic hydrocarbon contaminants from olefin- and/or diolefin-rich streams involves contacting the contaminated mixture with a catalyst comprising an iron oxide promoted with at least one of a suitable alkalizing agent and chromium oxide to selectively hydrogenate the acetylenic hydrocarbon contaminants without appreciable hydrogenation of the olefin and diolefin constituents and thereby remove the acetylenic hydrocarbons from the stream, as disclosed and claimed in the co-pending application of Gene Nowlin, Serial No. 363,400, filed June 22, 1953, now U.S. Patent 2,775,634, and in the co-pending application of Paul C. Husen, Serial No. 371,632, filed July 31, 1953, now abandoned.

The catalyst with which this invention is concerned can be prepared by reducing a mass obtained by promoting iron oxide with at least one of potassium oxide and chromium oxide. The catalyst preferably employed, prior to reduction at a temperature in the range of 650–1300° F. in the presence of hydrogen, is an alkalized iron oxide-chromium oxide, e.g., $Fe_2O_3$—$Cr_2O_3$—$KOH$. In the presence of carbon dioxide the KOH is converted to $K_2CO_3$. Concentrations of from about one to about 40 weight percent chromium oxide and 0.2 to 50 weight percent alkali, calculated as the oxide, are operative, the remainder being iron oxide. Iron oxide preferably constitutes the preponderant proportion of the catalyst and is preferably in excess over all other constituents combined with the possible exception of a diluent. A now preferred catalyst for the said selective hydrogenation comprises 65–95 weight percent iron oxide.

These catalysts can be prepared by mixing or grinding or promoting iron oxide with chromium oxide and incorporating therein a suitable inorganic alkalizing agent, for example, one or more of the common alkalis, e.g., oxides, hydroxides and/or basic salts (e.g. carbonates) of the alkalis or even alkaline earth metals; thus a salt which is decomposable to the oxide is ordinarily employed. In the case of the alkaline earth compounds, salts hydrolyzable to the hydroxide may be used when water is added in the process of catalyst manufacture, e.g., just prior to extrusion. Thus, the salt is ultimately decomposable to the oxide when the catalyst is heated at an elevated temperature. A suitable mixture of nitrates can be thermally decomposed followed by ignition and finally by a reduction at about 850–1000° F. in an atmosphere of hydrogen. Coprecipitation methods, for example coprecipitation of hydrous gels or oxides or sols can also be employed. One skilled in the art can determine by mere routine test the optimum composition, starting materials and modus operandi which yield the desired results in any particular case. Surface area and characteristics can affect the degree of selectivity of some catalysts and, as will be understood by one skilled in the art, the ignition or calcination temperature as well as the reduction can be varied to obtain optimum results in the case of each catalyst and hydrocarbon stream treated. In one method of preparation these catalysts which contain iron, chromia and potassium compounds are prepared by thoroughly admixing or grinding together iron oxide and chromium oxide, then forming a paste thereof with a solution of the desired potassium compound, for example, potassium hydroxide. Upon pelleting and drying, the catalyst can be ignited and then reduced at about 950° F. in hydrogen.

The iron oxide, which is admixed with the remaining catalyst ingredient or ingredients, can be prepared by calcining a precipitated iron oxide in the form of a powder at an elevated temperature, for example in the range 1475–1600° F. until its surface area has been reduced to below about 8 square meters per gram or until its apparent density is equivalent to about 250 pounds per barrel. At this stage the iron oxide is of a brownish-red color and has a formula of $Fe_2O_3$. Further calcination may be effected under reducing conditions in which event the iron oxide will be partly or completely in the form of black $Fe_3O_4$. Since these catalysts are reduced at an elevated reducing temperature prior to use, some elemental iron will be present in the finished catalyst together with iron oxide.

In carrying out the selective hydrogenation employing a promoted iron oxide catalyst of the kind above described, a major proportion of the acetylenic contaminant is hydrogenated, there being sufficient quantity of hydrogen present for that purpose, and the remaining acetylenic contaminants are removed by what appears to be polymerization. The product of the removal is referred to herein as "polymer." Often from 75 to 95 percent of the acetylenic contaminant is hydrogenated. The selective hydrogenation step, which can also be referred to as the "purification" reaction, i.e., to remove acetylenic contaminants, is advantageously carried out in the presence of the defined iron oxide catalyst at a temperature in the range of 250–650° F., a pressure of 0–900 p.s.i.g. and a space velocity of 100–12,000, preferably 2,000–8,000, gaseous volumes per volume of catalyst per hour, although when desired, conditions outside these ranges can be employed.

Improvement in the purification process is obtained by conducting the said process in the presence of water vapor in an amount up to about 12 mol percent based on total gaseous feed being treated in the presence of a partially reduced catalyst of the kind above described at about 400–800° F. employing a gaseous hourly space velocity of about 100–12,000 and at a pressure of 0–1000 p.s.i.g., this latter embodiment being disclosed and claimed in the co-pending application of Serial No. 454,033, filed September 3, 1954, now U.S. Patent 2,851,504.

When referring herein to the acetylenic contaminants, it is meant to include not only the acetylenic compound $C_2H_2$ but also any acetylenic material, as for example methylacetylene, ethylacetylene, dimethylacetylene, vinylacetylene, diacetylene, and the like.

In employing a catalyst of the kind described herein in carrying out the purification process above described, we have found, in accordance with our invention, that there is an inherent extended period of induction encountered when employing the catalyst; and, when initiating the purification process by charging a stream of the feed stock, containing olefins, in contact with the catalyst, when it is not prereduced and precoked, under the contemplated process temperature conditions, the required period of induction is often as long as from 6–7 days. During that entire period olefin loss together with inefficient acetylene conversion ordinarily take place. This extended period of induction, we have found, in accordance with our invention, can be advantageously utilized, such as in cyclic plant operation described hereinafter. In most cases, however, it is important that the said induction period be minimized or substantially eliminated, whereby to substantially reduce olefin loss and inefficiency of acetylene conversion. This invention in one form provides a method for conditioning the iron oxide type catalyst above referred to, for use in the said purification process whereby the said induction period, otherwise encountered is markedly shortened or substantially eliminated and efficient selective removal of acetylenic contaminants, with substantially no olefin loss, is initated immediately upon going "on stream."

In accordance with one form of this invention, a method is provided for conditioning a catalyst comprising an iron oxide promoted with at least one of a suitable alkalizing agent and chromium oxide, prior to utilization of the said catalyst in the catalytic selective hydrogenation of acetylene compounds present in a gas containing same together with other gases capable of hydrogenation. The conditioning is effected by contacting a gas containing a cokable material with the said catalyst, under conditions for coking the cokable material, so as to deposit coke on the catalyst surface, whereby the catalyst is conditioned so as to eliminate or shorten the induction period otherwise encountered when initially employing the catalyst in the said selective hydrogenation.

In accordance with a now preferred concept, the catalyst, ordinarily reduced prior to use of same in effecting the said selective hydrogenation, is reduced simultaneously with treatment thereof under the coking conditions defined above. When employing the feed gas, as the conditioning gas, while simultaneously effecting reduction and coking, the induction period is markedly shortened or substantially eliminated when the conditioning temperature is above that employed during the purification step, i.e. process step to effect removal of acetylenics. When substantially the same temperature is employed for removal of acetylenics and for conditioning, the induction period, although longer than when employing the higher conditioning temperature, is advantageously employed, particularly in respect of cyclic operation, described hereinafter.

In the preferred practice of this invention, the cokable material is conveyed in a carrier gas and the resulting "conditioning" gas is passed in contact with the catalyst to be treated under the treating conditions.

In accordance with another concept, the conditioning gas is the said stream to be subjected to the said selective acetylene hydrogenation and is preferably an olefin- and/or diolefin-rich gas containing the acetylenic component, and is contacted with the catalyst to condition the same, at a temperature of at least 25° F. above that temperature required for effecting substantially complete selective hydrogenation of the acetylenic contaminant, this temperature relationship being employed when the water concentration in the said stream to be subsequently selectively hydrogenated is substantially the same as that of the said feed stream while employed during the conditioning. As discussed hereinafter, conditioning temperatures may be otherwise when the concentration of water in the said stream, as a conditioner, is different from that of the feed stream subjected to selective hydrogenation.

Any suitable cokable material can be employed in the practice of this invention, it being important that the material selected be cokable at a temperature below the sintering temperature of the catalyst. Now preferred cokable materials are inclusive of acetylene, diolefins, as for example butadiene, a debutanized aromatic "concentrate" recovered from thermal and/or catalytic cracking of hydrocarbons, and liquid "polymer" formed during the selective hydrogenation as discussed hereinabove.

Any suitable carrier gas, i.e., for conveying the cokable material under coking conditions in contact with the catalyst to be conditioned, can be employed. Thus, carrier gases advantageously employed are inclusive of residue gas which is principally hydrogen and methane such as from low pressure hydrocarbon cracking, hydrogen, methane, nitrogen, and mixtures thereof. Now preferred carrier gas materials are reducing gases such as hydrogen or hydrogen-methane, such fractions being often recovered from hydrocarbon cracking, or the like, so that simultaneously with the conditioning step, the catalyst is prereduced.

Preferred concentrations of cokable material in the carrier gas are, on a mol basis, from about ½ to about 5 percent.

Temperatures employed for conditioning the catalyst in accordance with this invention, which are below the catalyst sintering temperature discussed above, will be dependent largely on the specfiic cokable material. Thus, a conditioning temperature within the range of 500–1500° F. is generally utilized, although a conditioning temperature of from about 725 to 825° F. is advantageously employed when the said "polymer" is utilized as the cokable material, and a temperature of about 525–700° F. is advantageously utilized when acetylene is employed as the cokable material. Often the prereducing and conditioning steps are effected separately and in that event it is usually desirable to employ temperatures of about the same level for each step.

When employing as the conditioning gas a feed stream, which subsequent to conditioning is that feed stream subjected to selective hydrogenation, the conditioning temperature, in accordance with one form of this invention, is at least 25° F. above the minimum temperature required for effecting essentially complete acetylenic contaminant removal when that feed stream is subjected to that treatment, more preferably the conditioning temperature is at least 50° F. above the said minimum temperature. It is to be noted, however, that these relative temperatures are applied only when the concentration of water in the conditioning gas and the gas too be treated are about the same. Otherwise the conditioning temperature will generally be altered accordingly. Thus, as illustrated by way of the graph of the attached figure, which shows the effect of water concentration in the feed stream subjected to selective hydrogenation, on the minimum temperature required for complete acetylenic contaminant removal employing a sufficiently active catalyst, an increase in the concentration of water in the feed stream to be selectively hydrogenated increases the minimum temperature required for effecting essentially complete removal of acetylenic contaminants; the attached figure being illustrative with reference to treatment of a cracked gas containing 0.5 percent acetylene, in contact with a completely conditioned alkalized iron oxide-chromium oxide catalyst at 400 p.s.i.g. and a space velocity at 3000 gas volumes per catalyst volume per hour. Because the minimum temperature required for effecting substantially complete acetylenic contaminant removal increases with water concentration, as shown, it is seen that, when the concentration of water in the gas subjected to selective hydrogenation is greater than that in the said gas employed during conditioning, the temperature at which the conditioning is to be carried out is not necessarily from 25–50° F. above the minimum temperature for effecting substantially complete selective hydrogenation and, in fact, in such a case the conditioning temperature can be lower than that of selective hydrogenation. Thus, it is seen that the conditioning temperature, when employing the feed gas also as a conditioning gas, is dependent upon the relative concentrations of water in the conditioning gas stream and in the said stream when subjected to selective hydrogenation. Thus, when these water concentrations are different and the concentration in the feed subjected to selective hydrogenation is higher, the conditioning temperature is correspondingly lower so that dependent upon the specific relative water concentration, the conditioning temperature may be, indeed, lower than that required for effecting substantially complete selective hydrogenation of the acetylenic contaminant in that case. Thus, when referring herein to conditioning temperatures employed relative to use of the feed stream to be selectively hydrogenated, as the conditioning gas, that temperature is expressed as at least 25–50° F. above the minimum required for effecting substantially complete selective hydrogenation when the concentration of water in the conditioning gas is substantially the same as that in the gas subjected to selective hydrogenation. When these concentrations vary, the conditioning temperature is altered accordingly.

We have found that, when employing a feed stream as the conditioning gas at a temperature above that of the subsequent acetylene removal step to obtain a shortened induction period, as above described, it is advantageous to maintain a small amount of water therein, since under such conditions olefins that might otherwise be hydrogenated are not hydrogenated. The amount of water present, in this embodiment, is preferably less than 2 mol percent of the conditioning gas. A water content of 0.1 mol percent generally requires a conditioning temperature of about 560° F., whereas water content of 0.5 and 2.0 mol percent, respectively, generally require conditioning temperatures of 675 and 1065° F. Thus, in order to preclude the need for relatively high conditioning temperatures and further because less than about 0.5 mol percent water, preferably about 0.1 to 0.3 mol percent, satisfactorily precludes olefin hydrogenation, a value in the latter range is preferred.

Preferred space velocities, expressed in terms of gaseous volumes per catalyst volume per hour, employed in the conditioning step of this invention, are generally in a range of from 100–12,000, a space velocity of 1,000–4,000 being preferred, although space velocities outside these ranges can be employed if desired.

We have found that by correlating conditioning temperature with water concentration in the conditioning gas we can regulate the required conditioning period; thus by increasing conditioning temperature and/or reducing concentration of water in the conditioning gas, correspondingly shorter conditioning periods can be employed. By way of example, when conditioning a catalyst whach had not been prereduced or precoked in accordance with this invention at a space velocity of conditioning gas of 6,000 gaseous volumes per catalyst volume per hour, at 800 p.s.i.g. and at 600° F., employing a concentration of water in the conditioning gas of 2 mol percent with about 0.15 weight percent of $C_2H_2$ as cokable material in the said conditioning gas, the said catalyst was conditioned for 99 percent acetylene removal in about six days. However, by increasing the temperature to about 1065° F. or by reducing the said water concentration to about 0.1 mol percent, the conditioning period is reduced to about 0.1 day.

We have thus found that space velocity, conditioning temperature, concentration of water in the conditioning gas, and concentration of cokable material in the conditioning gas can be advantageously correlated to regulate the length of the conditioning period over a broad range.

The duration of the conditioning is, of course, further dependent upon the characteristics of the cokable material utilized and the amount of coking contemplated. It is desired in most instances to effect the conditioning for a period sufficient to provide for depositing at least one weight percent of cokable material on the catalyst surface, i.e., based on the weight of catalyst being conditioned. Generally, the amount of coke deposited on the catalyst surface does not exceed about 2 weight percent and the duration of the conditioning, therefore, is within the range of about 2 hrs. to about 3 hrs.

Pressures employed during the conditioning step of this invention can be utilized over a broad range of about 0–1,000 p.s.i.g., although generally a pressure below 500 p.s.i.g. is employed. However, pressures outside that range can be employed if desired.

The "polymer" material, above referred to, formed during selective hydrogenation of acetylene present as a contaminant in product from cracking ethane, propane or butane is believed to comprise a mixture of gaseous compounds formed by a combination of a polyethylene chain with one or more substituted benzene rings.

A preferred debutanized aromatic concentrate employed as a cokable material, in accordance with this invention, is that removered from thermally cracking a hydrocarbon stock such as ethane, propane, butane, light naphtha or the like, and comprises in the order of up to about 35 weight percent benzene, 10–15 weight percent toluene and the remainder dicyclopentadiene, and $C_5$ and heavier hydrocarbons.

Both new, i.e., fresh, and regenerated catalyst can be conditioned in accordance with this invention.

It will be understood that a temperature of at least 25° F., preferably at least 50° F., above that to be used in the acetylene removal step (basis of water concentrations discussed herein), is one at which good conditioning for the particular acetylene removal operation can be obtained. It is now believed that in its optimum form this invention also requires that the conditioning temperature be not substantially above about 100° F., above the acetylene removal temperature.

Our invention is illustrated by way of the following examples.

EXAMPLE I

Several alkalized iron oxide-chromium oxide catalysts were prereduced employing a synthetic refinery residue gas containing 70 percent methane and 30 percent hydrogen and the activity of these catalysts for obtaining complete acetylene removal was compared with that of a catalyst which was prereduced to the same degree but which was first subjected to a conditioning step of this invention by contacting with the synthetic residue gas containing liquid polymer recovered from the purification process under conditions for coking the polymer. Data comparing the results of these procedures are given in the following table.

duced at one atmosphere pressure with a synthetic residue gas comprising 70 percent methane and 30 percent hydrogen; whereas, in Table III that catalyst was conditioned by performing the reducing and coking steps simultaneously with the acetylene-contaminated stream to be purified. In the purification processes reported in each of these tables, the hydrocarbon stream fed to the purification zone was a cracked gas containing 0.5 mol percent acetylene, 10 mol percent hydrogen, 39 mol percent methane, 8 mol percent ethane, 28 mol percent ethylene, 13 mol percent propylene, 1.5 mol percent propane and 1.0 mol percent $C_4$ hydrocarbons. The process conditions for the purification step included, in addition to the process conditions given in the tables, a pressure of 400 p.s.i.g. and a gaseous hourly space velocity of 3000. The time required during the purification step to bring the prereduced catalyst to full activity, as defined by the curve shown in the accompanying drawing, at the given temperature level, is reported in Table II, so that the total time for conditioning of the catalyst, including the time required for prereducing, can be compared to the time required for activation of the catalyst by the one-step process reported in Table III. A comparison of run I in each table shows that a saving of 3.1 hours, which is equivalent to about 60 percent based on the time required for the two-step process, was effected by the process of this invention with a water content of 0.1 mol percent in the con-

*Table I*

| | Prereduction | | | | | Conditioning by "Coking" | | | | Activity at 525-550° F. (Percent Removal of Acetylene at—) [4] | | | |
|---|---|---|---|---|---|---|---|---|---|---|---|---|---|
| Run No. | Gas | Pressure (p.s.i.g.) | Temp., °F. (avg.) | Time (hrs.) | Percent Reduction | Carrier Gas | Pressure (p.s.i.g.) | Temp., °F. (Avg.) | Time (hrs.) | Hours on Stream | | | |
| | | | | | | | | | | 0.5 | 1.0 | 2.0 | 2.5 |
| I | methane-hydrogen.[1] | Atm. | 610 | 3.2 | | None | None | None | None | 20 | 20 | | |
| II | ...do.[1] | Atm. | 815 | 1.0 | 12 | ...do | None | None | None | <10 | <10 | <10 | <10 |
| III | ...do.[1] | 125 | 610 | 1.5 | ~7 | ...do | None | None | None | <10 | <10 | | |
| IV | cracked gas [2] | 400 | 600 | 2.0 | ~10 | ...do | None | None | None | ~20 | ~20 | ~20 | |
| V | methane-hydrogen.[1] | Atm. | 725 | 0.7 | 11 | methane-hydrogen plus polymer.[3] | Atm. | 725 | 1.2 | 98 | 98 | | 99.5 |

[1] A synthetic refinery residue gas containing 70 mol percent methane and 30 mol percent hydrogen.
[2] Deacetylized. With acetylene present this treatment completely conditions the catalyst.
[3] Synthetic refinery gas, 70 mol percent methane and 30 mol percent hydrogen, containing 1 to 2 mol percent liquid polymer produced during a deacetylization of cracked gas, i.e., to remove acetylene by selective hydrogenation.
[4] Removal of acetylene (0.5 mol percent) from gaseous effluent from cracking butane at 1400° F.
The runs listed in the foregoing tabulation were conducted at a space velocity of about 1000.
The catalyst employed in each of the foregoing tabulated runs was 87.5 wt. percent $Fe_2O_3$, 2.6 wt. percent $Cr_2O_3$, 9.9 wt. percent KOH.

EXAMPLE II

Data showing the time saved by simultaneously conducting the prereducing and coke deposition steps of our conditioning process at various temperatures are given in Tables II and III. In Table II, a defined alkalized iron oxide-chromium oxide catalyst was preretaminated stream. The data in runs II and III of Table III show that the conditioning temperature can be equal to or below the temperature employed in the purification process when the concentration of water in the hydrocarbon stream to be purified is greater than the concentration of water in the activation gaseous stream.

*Table II*

| | Prereduction [1] | | | Treatment of Cracked Gas for Selective Removal of Acetylene Therein [2] | | | | |
|---|---|---|---|---|---|---|---|---|
| Run No. | Temp., °F. | Percent Reduction of Catalyst | Time (Hrs.) | $H_2O$ Concentration In cracked Gas (Mol Percent) | Initial Activation, Percent $C_2H_2$ Removal | Temp., °F. | Time [3] To Achieve Level Of Complete $C_2H_2$ Removal (Hours) | Total Required Time (Hrs.) |
| I | 610 | | 3.2 | 0.1 | 20 | 547 | 2.0 | 5.2 |
| II | 615 | 10 | 5.0 | 1.0 | 90 | 620 | 8.0 | 13.0 |
| III | 630 | 10 | 4.0 | 2.0 | 80 | 650 | 13.0 | 17.0 |

[1] Conducted at one atmosphere with 70 mol percent $CH_4$—30 mol percent $H_2$—i.e., prior to going "on stream" to effect selective acetylene hydrogenation.
[2] Prereduction and initial "on stream" to effect selective acetylene hydrogenation of cracked gas containing 0.5 mol percent $C_2H_2$, at 400 p.s.i.g., 3000 v./v./hr.
[3] Time required to condition and prereduce the catalyst operating at the given temperature level.

Table III

| Run No. | Activation [1] | | | Treatment of Cracked Gas for Selective Removal of Acetylene Therein [2] | | | |
|---|---|---|---|---|---|---|---|
| | Temp., °F. | H₂O Concentration In cracked Gas (Mol Percent) | Time (Hrs.) | H₂O Concentration In cracked Gas (Mol Percent) | Initial Activation, Percent C₂H₂ Removal | Temp., °F. | Total Required Time (Hrs.) |
| I | 600 | 0.1 | 2.1 | 0.1 | 99.99 | 525 | 2.1 |
| II | 595 | 0.2 | 4.0 | 0.8 | 99.99 | 595 | 4.0 |
| III | 575 | 0.0 | 2.3 | 3.3 | 99.99 | 645 | 2.3 |

[1] Prereduction and "coking" conducted simultaneously at one atmosphere, at a space velocity of 1000, employing as the conditioning gas the C₂H₂-contaminated gas described in note 2 below, to be subsequently purified.
[2] Purification (after combined prereduction and conditioning) was applied to cracked gas containing, on a mol basis 0.5 percent C₂H₂, 10 percent hydrogen, 39 percent methane, 8 percent ethane, 28 percent ethylene, 13 percent propylene and 1.5 percent propane and C₄ hydrocarbons, at 400 p.s.i.g. 3000 v./v./hr.

When conditioning, i.e., simultaneously reducing and coking the selective hydrogenation catalyst at substantially the same temperature as that to be employed in carrying out the process step for removal of acetylenic contaminants using as the conditioning gas the feed gas containing water, the induction, as above described, is of several days duration, e.g., 5–7 days. This embodiment is advantageously applied to cyclic plant operation wherein two reaction chambers, each containing portions of the said catalyst, are disposed in series, each chamber being operated on about a one week cycle, the first being on the "conditioning" cycle while the second is on the "process" cycle, with about one day for regeneration of catalyst subsequent to the process step. Operating cyclically in this manner, there is no possibility of excessive olefin loss taking place. In carrying out this embodiment, two chambers, each containing catalyst, as described, are connected in series. Feed gas for the "process" cycle is also employed as a conditioning gas, and is passed in contact with new or regenerated catalyst in the first chamber at the conditioning temperature, the required conditioning period being, for example six days. Effluent gas from the conditioning step is then passed in contact with catalyst in the second chamber (previously conditioned) for about the same duration of time under the same conditions of temperature, pressure and time to effect removal of acetylenics. Effluent from the second chamber is withdrawn as product. Regeneration of catalyst subsequent to the process cycle requires about one day. It is seen, therefore, that, although it is an important feature of our invention that conditions are provided for conditioning the catalyst so as to shorten or substantially eliminate induction period, nevertheless, in accordance with one concept, the conditioning is advantageously maintained over a relatively long period which is achieved by maintaining the conditioning and process steps at substantially the same temperature levels.

In carrying out this latter embodiment, it is important that about 2 mol percent of water be present in the conditioning-feed gas, this amount, however, being variable, preferably from about 0.5 to 3 mol percent. In this manner any olefin loss by hydrogenation taking place during the conditioning cycle is substantially lessened.

The cylic process herein described is preferably carried out (in each cycle) at a pressure in the range of 200 to 1000 p.s.i.g., a space velocity of 100 to 12,000 gas volume (N.T.P.) per volume of catalyst per hour, at a temperature of from 560 to 850° F. and water in the feed to the conditioning step, in the preferred range, generally about 2 mol percent.

The following tabulation illustrates effect of time of conditioning on the efficiency of acetylene removal achieved during the process step and shows that, when the conditioning and process cycles are conducted at about the same temperature, the induction period is from 60–70 hours, i.e., under the specific conditions illustrated.

| Time on Stream (Hours) | Reactor Temp. (° F.) | | Removal of Acetylene (percent) | Olefin Loss (percent) |
|---|---|---|---|---|
| | Inlet | Outlet | | |
| 1 | 565 | 605 | 60 | 0.0 |
| 5 | 550 | 600 | 60 | 0.0 |
| 10 | 550 | 600 | 72 | 0.4 |
| 20 | 555 | 600 | 83 | 1.2 |
| 30 | 550 | 600 | 87 | 0.5 |
| 40 | 545 | 595 | 95 | 0.3 |
| 50 | 550 | 600 | 95 | 0.3 |
| 60–70 | 560 | 610 | 97 | 0.5 |

Conditions: Catalyst 87.5 wt. percent Fe₂O₃, 2.6 wt. percent Cr₂O₃, 9.9 wt. percent KOH (3/16″ pellets), 6000 v./v./hr., 550° F. inlet, 800 p.s.i.g., feed gas containing 2 mol percent water and 0.15 mol percent acetylene.

Reasonable variation and modification are possible within the scope of the foregoing disclosure and the appended claims to the invention, the essence of which is (1) that a catalyst has been provided comprising an iron oxide promoted with at least one of a suitable alkalizing agent and chromium oxide, and containing a deposition of carbonaceous material on its surface, comprising in a preferred form an alkalized iron oxide-chromium oxide which has been contacted with a gas containing a cokable material under conditions causing coking of the said material so as to deposit coke on the said catalyst, and (2) that a catalyst comprising an iron oxide promoted with at least one of a suitable alkalizing agent and chromium oxide is conditioned prior to contacting the same with a gas containing acetylenic contaminants together with other gases which are capable of hydrogenation to selectively remove the acetylenic contaminants, under hydrogenation conditions, by contacting under coking conditions with the said catalyst, a gas containing a cokable material so as to deposit coke on the surface of the said catalyst; a now preferred form of this invention providing for conditioning an alkalized iron oxide-chromium oxide catalyst prior to contacting the same with a gaseous effluent from hydrocarbon cracking, such as ethane, propane and/or butane cracking, to selectively remove acetylenic contaminants therefrom, by first contacting the catalyst with a stream of the said effluent preferably at a temperature different from that employed during the acetylene removal step, the preferred conditioning temperature being at least 25–50 degrees higher than, but preferably not higher than about 100° F. above that of the acetylene removal step when the concentrations of water in both the conditioning and selective removal feed stream are about the same and proportionately lower with greater concentrations of water in the feed to the selective removal step; the invention in accordance with a preferred practice, providing for conducting the above described catalyst conditioning simultaneously with effecting prereduction of the catalyst, although, when desired, these two steps can be effected separately; all substantially as set forth and described herein.

We claim:

1. In the treatment of a catalyst, comprising an iron oxide promoted with a suitable alkalizing agent and chromium oxide, prior to contacting the same with a gas containing acetylenic contaminants and other compounds capable of hydrogenation to selectively remove said contaminants under hydrogenation conditions, wherein an induction period is encountered when initially employing said catalyst in the said selective removal, the step providing for substantially eliminating said induction period comprising contacting said catalyst with a gas containing cokable material under conditions for coking said material, thereby first depositing coke on the said catalyst, wherein the said cokable material is at least one selected from the group consisting of butadiene, acetylene, a polymer formed as by-product during selective removal of the said acetylenic contaminants, an aromatic product fraction of hydrocarbon cracking, and a feed stream to be subsequently subjected to the said selective removal step; the last said stream being utilized during the coke deposition step at a temperature correlated with water concentration therein during coke deposition and during said selective removal of acetylenic contaminant so that the said coking is conducted at a temperature of at least 25–50° F. higher than that of said selective removal, when said water concentrations are about the same, and when water concentrations in the said streams are different and the water concentration in the stream subjected to the said selective removal is the higher, said coke deposition being conducted at a correspondingly lower temperature consonant with the degree of said difference, but when the water concentration in said stream subjected to the said selective removal of acetylenic contaminants is the lower, said coke deposition being conducted at a correspondingly higher temperature consonant with the degree of the said difference.

2. In the treatment of a catalyst, comprising an iron oxide promoted with a suitable alkalizing agent and chromium oxide, prior to contacting the same with a gas containing acetylenic contaminants and other compounds capable of hydrogenation to selectively remove said contaminants under hydrogenation conditions, wherein an induction period is encountered when initially employing said catalyst in the said selective removal, the step providing for substantially eliminating said induction period comprising contacting said catalyst with a gas containing cokable material under conditions for coking said material, thereby first depositing coke on the said catalyst, wherein said gas to be first contacted with said catalyst contains at least one of olefins and diolefins and contains acetylene as the said cokable material.

3. In the treatment of a catalyst, comprising an iron oxide promoted with a suitable alkalizing agent and chromium oxide, prior to contacting the same with a gas containing acetylenic contaminants and other compounds capable of hydrogenation to selectively remove said contaminants under hydrogenation conditions, wherein an induction period is encountered when initially employing said catalyst in the said selective removal, the step providing for substantially eliminating said induction period comprising contacting said catalyst with a gas containing cokable material under conditions for coking said material, thereby first depositing coke on the said catalyst, wherein said gas to be first contacted with the said catalyst is a reducing gas which comprises in a major proportion a mixture of at least one normally gaseous hydrocarbon with hydrogen.

4. In the conditioning of an alkalized iron oxide-chromium oxide catalyst containing, on a weight basis, from 65–95 percent iron oxide, from 1–40 percent chromium oxide, and from 0.2 to 50 percent alkali calculated as the oxide, prior to contacting the same with a gas containing acetylene and at least one of the group of olefins and diolefins to selectively remove acetylene under hydrogenation conditions, the step of contacting with said catalyst a gas containing a cokable material under conditions for coking the said material so as to deposit coke on the surface of said catalyst, wherein the said cokable material is selected from the group consisting of butadiene, acetylene, a polymer formed as by-product during selective removal of the said acetylenic contaminants, an aromatic product fraction of hydrocarbon cracking, and a feed stream to be subsequently subjected to the selective removal step; the last said stream being utilized during the coke deposition step at a temperature correlated with water concentration therein during coke deposition and during said selective removal of acetylenic contaminant so that the said coking is conducted at a temperature of at least 25–50° F. higher than that of said selective removal, when said water concentrations are about the same, and when water concentrations in the said streams are different and the water concentration in the stream subjected to the said selective removal is the higher, said coke deposition being conducted at a correspondingly lower temperature consonant with the degree of said difference, but when the water concentration in said stream subjected to the said selective removal of acetylenic contaminants is the lower, said coke deposition being conducted at a correspondingly higher temperature consonant with the degree of the said difference.

5. The process of claim 4 wherein the temperature employed under said coking conditions is up to 1500° F.

6. The process of claim 4 wherein said cokable material is a polymer by-product of said selective acetylenic contaminant removal and the temperature of said coking is within the range of about 700–850° F.

7. The process of claim 4 wherein said cokable material is acetylene and the temperature of said coking is in the range of about 525–700° F.

8. The process of claim 4 wherein gas contacted with said catalyst under the said coking conditions is maintained in said contact at a pressure in the range of 0–1000 p.s.i.g., a space velocity of 100–12,000 gaseous volumes per catalyst volume per hour, and a temperature of from 500–1500° F.

9. The process of claim 8 wherein said pressure is 0–500 p.s.i.g., and said space velocity is 1000–4000.

10. In the conditioning of an alkalized iron oxide-chromium oxide catalyst containing, on a weight basis, from 65–95 percent iron oxide, from 1–40 percent chromium oxide, and from 0.2 to 50 percent alkali calculated as the oxide, prior to contacting the same with a gas containing acetylene and at least one of the group of olefins and diolefins to selectively remove acetylene under hydrogenation conditions, the step of contacting with said catalyst a gas containing a cokable material under conditions for coking the said material so as to deposit coke on the surface of said catalyst, wherein said catalyst is conditioned for use in the selective removal of acetylene present as a contaminant in effluent from cracking a normally gaseous hydrocarbon, wherein the gas first contacted with said catalyst to deposit coke thereon is the said effluent stream to be subjected to selective removal of acetylene and contains substantially the same concentration of water during the period of coke deposition as contained during the subsequent selective acetylene removal step, and wherein the temperature employed during the prior treatment to deposit coke on the catalyst is effected at a temperature at least 25° F. higher than that employed during the said selective removal step.

11. A process for conditioning an alkalized iron oxide-chromium oxide catalyst, containing, on a weight basis, from 65–95 percent iron oxide, from 1–40 percent chromium oxide, and from 0.2–50 percent alkali calculated as the oxide, and for use of resulting conditioned catalyst in effecting selective removal of acetylenic contaminants from a gas also containing at least one of the group consisting of olefins and diolefins, comprising regenerating a mass of catalyst previously employed in effecting said removal of acetylenic contaminants by contacting said catalyst with an oxidizing gas at elevated temperatures; passing in contact with said regenerated catalyst a stream of said gas from which acetylenes are to be removed and also containing sufficient hydrogen to hydrogenate said acetylenics together with from 0.5 to 3 mol percent of water, at a temperature in the range of 560 to 850° F., a pressure in the range of 200 to 1000 p.s.i.g., and at a space velocity of 100 to 12,000 gas volumes per catalyst volume per hour for a period of from 5–7 days, whereby simultaneously said catalyst is reduced and coke is formed and deposited on said catalyst so as to condition same for effecting efficient removal of said acetylenes when subsequently contacted with the feed gas containing the same; passing gaseous effluent from said first mass of catalyst into contact with a second mass of the first described catalyst, conditioned as above described, for a period of 5–7 days under the aforesaid conditions of time, temperature and pressure, and recovering gaseous effluents from which substantially all acetylenes contaminants have been removed.

12. The process of claim 11 wherein said contaminant is acetylene.

References Cited in the file of this patent

UNITED STATES PATENTS

| | | |
|---|---|---|
| 2,408,140 | Gutzeit | Sept. 24, 1946 |
| 2,414,585 | Eggertson et al. | Jan. 21, 1947 |
| 2,422,251 | O'Brian et al. | June 17, 1947 |
| 2,478,899 | D'Ouville | Aug. 16, 1949 |
| 2,509,869 | Kirshenbaum | May 30, 1950 |
| 2,658,858 | Lang et al. | Nov. 10, 1953 |
| 2,677,668 | Ahlberg | May 4, 1954 |
| 2,683,123 | Schwegler | July 6, 1954 |
| 2,775,634 | Nowlin | Dec. 25, 1956 |